(12) United States Patent
Poppe

(10) Patent No.: US 7,014,222 B1
(45) Date of Patent: Mar. 21, 2006

(54) TUBE CONNECTION SYSTEM

(75) Inventor: Carl H. Poppe, Sebastopol, CA (US)

(73) Assignee: Rheodyne, LLC, Rohnert Park, CA (US)

( * ) Notice: Subject to any disclaimer, the term of this patent is extended or adjusted under 35 U.S.C. 154(b) by 682 days.

(21) Appl. No.: 09/800,264

(22) Filed: Mar. 5, 2001

(51) Int. Cl.
*F16L 25/00* (2006.01)

(52) U.S. Cl. .............................. 285/332.1; 285/124.3; 285/341

(58) Field of Classification Search ................ 285/332, 285/332.1, 332.2, 332.3, 354, 357, 124.3, 285/124.4, 124.1, 341
See application file for complete search history.

(56) References Cited

U.S. PATENT DOCUMENTS

| | | | |
|---|---|---|---|
| 1,394,071 A | | 10/1921 | Driscoll |
| 2,349,180 A | | 5/1944 | Lamont |
| 2,474,179 A | | 6/1949 | Wurzburger |
| 2,491,884 A | * | 12/1949 | West ........................... 285/341 |
| 2,640,716 A | * | 6/1953 | Bigelow ...................... 285/341 |
| 2,701,149 A | * | 2/1955 | Kreidel et al. ............... 285/341 |
| 2,761,704 A | | 9/1956 | Crawford |
| 2,873,985 A | | 2/1959 | Baldwin Jr. |
| 3,007,721 A | | 11/1961 | Schmohl et al. |
| 3,103,373 A | | 9/1963 | Lennon et al. |
| 3,219,367 A | * | 11/1965 | Franck ........................ 285/341 |
| 3,552,781 A | | 1/1971 | Helland |
| 3,722,923 A | | 3/1973 | Grahl |
| 3,733,093 A | | 5/1973 | Seiler |
| 3,893,716 A | * | 7/1975 | Moreiras et al. ............. 285/341 |
| 3,909,046 A | | 9/1975 | Legris |
| 3,989,283 A | | 11/1976 | Pepper |

(Continued)

FOREIGN PATENT DOCUMENTS

FR 599646 1/1926

(Continued)

OTHER PUBLICATIONS

SpecSheet Brochure from Upchurch Scientific for the "Micro Injection Valve", 2 pages, Aug. 1999.

*Primary Examiner*—David Bochna
(74) *Attorney, Agent, or Firm*—Beyer Weaver & Thomas LLP

(57) ABSTRACT

A fluid fitting assembly for a fluid-tight coupling of a plurality of tube members to a connector member as a unit A RAM device having proximal surface and an opposite distal surface facing toward the connector member, and a plurality of alignment passages each defined by an alignment passage extending from the proximal face to the distal face for sliding receipt of a respective tube member therethrough. A plurality of ferrule devices is also included each having a proximal tube engaging portion, an opposite distal sealing portion and a tube receiving passage extending from the tube engaging portion to the sealing portion and formed for receipt of a respective tube member therethrough. Each tube engaging portion is formed and dimensioned to contact a respective alignment wall of the RAM device and each the sealing portion of the ferrule device is formed and dimensioned to contact a respective sealing wall of the connector member such that when a compression force is increasingly applied to the RAM device in the direction toward the connector member, the respective alignment walls of the RAM device contact the tube engaging portions of the ferrule devices. The corresponding tube members are then increasingly radially gripped for movement of the ferrule devices and the RAM device, as a unit, toward the connector member to increasingly urge the ferrule device sealing portions into fluid sealing engagement with the connector member sealing wall and to fluidly couple the tube member conduits to the corresponding connector member passages.

65 Claims, 6 Drawing Sheets

U.S. PATENT DOCUMENTS

| | | | | |
|---|---|---|---|---|
| 4,235,461 A | * | 11/1980 | Normark | 285/341 |
| 4,445,714 A | | 5/1984 | Kisiel, III | |
| 4,486,072 A | | 12/1984 | Roberts | |
| 4,712,813 A | | 12/1987 | Passerell et al. | |
| 4,848,802 A | * | 7/1989 | Wolf et al. | 285/341 |
| 4,964,657 A | * | 10/1990 | Gonzales | 285/332 |
| 4,995,646 A | * | 2/1991 | Johnston et al. | 285/124.3 |
| 5,308,122 A | * | 5/1994 | Crawford et al. | 285/332.4 |
| 5,351,998 A | * | 10/1994 | Behrens et al. | 285/341 |

FOREIGN PATENT DOCUMENTS

| | | |
|---|---|---|
| GB | 534772 | 3/1941 |
| IT | 299039 | 7/1932 |
| JP | 3-5750 | 9/1987 |

* cited by examiner

US 7,014,222 B1

TUBE CONNECTION SYSTEM

TECHNICAL FIELD

The present invention relates to connectors for tube assemblies, and more particularity, relates to a connectors having ferrules for tubes in high pressure fluid systems.

BACKGROUND ART

Modern analytical instruments and equipment applied in high pressure liquid systems have inherently become more complex. This axiom also applies to tube connectivity and interchangeability where instrument designers are challenged to connect fluid and gas lines easily, reliably and inexpensively.

Typically, two alternative fluid connections to these fluid flows, such as High Pressure Liquid Chromatography (HPLC), Flow Injection Analysis (FIA) and Total Organic Carbon (TOC), to name a few, have been employed. The first approach is to modify the tubing (such as flaring the end of the tube) to enable a threaded nut to drive a washer or o-ring device down on the flare which in turn pushes on a flat-bottom receiving section of the device to make a seal.

The next approach, and perhaps the more common approach, is to add a compression ferrule between the tube and the device receiver which allows a threaded nut to drive the ferrule and tube together and against a conical receiving section of the device to create a seal. Generally, compression ferrules are employed as reliable and simple fluid line connections in high pressure liquid systems such as High Pressure Liquid Chromatography (HPLC) and DNA sequencing systems. These compression ferrules are relatively small conical structures which cooperate with one or two-piece tube fittings to form fluid-tight connections to the instrument tubing. Typical of such compression ferrules fittings are the RHEFLEX® Precision, Twist-Free and Flangeless PEEK Fittings by Rheodyne, L. P. of Rohnert Park, Calif.

To match the chemical inertness of the components with the demands of the chemistry applied within the analytical instrument, various materials are utilized for the tubing, nuts, washers, o-rings and ferrules. These include PEEK, Stainless Steel, Kel-F, etc.

Additionally, various thread designs have been used in an attempt to minimize the size of the device receiver (stator in the case of an injection valve). These include nuts with ¼–28, 10–32, M4, etc, threads. By using progressively smaller threaded fittings, manufacturers are able to reduce the size of the functioning device, as the footprint is often limited by the geography required to make tubing connections. Indeed, most manufacturers have been forced to machine complex "angles-of-approach" for the tubing connections (ports) as a way of accommodating the size of the connector (threaded nut). It should be noted that the complex machining procedures burden these devices with a high cost structure and therefore, expensive market price.

Finally, the use of individual threaded nuts for each tube greatly complicates the process of installing and removing the tubes. As tubing densities increase the impracticality of using individual threaded fittings becomes obvious.

Accordingly, as modern fluid connections increase in density, it is desirable to simplify the fluid connection with the plurality to tubes, while minimizing the overall size of the functioning device.

DISCLOSURE OF INVENTION

The present invention provides a high pressure fluid fitting assembly for a fluid-tight coupling of a tube member to a connector member. The tube member includes a fluid conduit terminating at a distal end thereof. The connector member includes a receiving port defined by an interior sealing wall which is formed for sliding receipt of the distal end of the tube member therein. The connector member further includes a fluid passage extending therethrough and terminating in the receiving port. The fluid fitting assembly includes a RAM device a having proximal surface and an opposite distal surface. An interior alignment wall of the RAM device defines an alignment passage extending from the proximal surface to the distal surface for sliding receipt of the tube member therethrough. A ferrule device is includes having a proximal tube engaging portion and an opposite distal sealing portion. A tube receiving passage extends from the tube engaging portion to the sealing portion and formed for sliding receipt of the tube member therethrough. The tube engaging portion is formed and dimensioned to contact the alignment wall of the RAM device, and the sealing portion is formed and dimensioned to contact the sealing wall of the connector member such that when a compression force is increasingly applied to the RAM device in the direction toward the connector member, the RAM device alignment wall contacts the ferrule device tube engaging portion. Such contact is performed in manner increasingly radially gripping the tube member for movement of the ferrule device and the RAM device, as a unit, toward the connector member to increasingly urge the ferrule device sealing portion into fluid sealing engagement with the connector member sealing wall. The tube member conduit is then fluidly coupled to the connector member passage.

This fluid fitting design is particularly suitable for multi-lumen fluid connection systems applied in flat-face or rotor valve technologies. Unlike the current fluid connections, the present invention enables simple insertion of all the tube member into their respective receiving ports, and then subsequently the tightening a spanner nut so that the entire cluster of tube members are fluid tight sealed to their corresponding fluid passages as a unit rather than independently. This not only simplifies use, but also reduces the overall size and reduces material costs.

In one embodiment of the present invention, the sealing portion of the ferrule device includes a sealing surface tapering inwardly toward the distal end thereof. This surface is formed increase the contact area with the connector member sealing wall as the compression force is increasingly applied.

In yet another embodiment, the tube engaging portion of the ferrule device includes an interior gripping surface defining at least a portion of the tube receiving passage proximate the tube engaging portion. This interior gripping surface increasingly circumferentially grips the tube member as the compression force is increasingly applied.

Another configuration of the RAM device includes a contacting wall portion of the alignment wall which tapers inwardly toward the proximal surface. The tube engaging portion of the ferrule device includes a proximal annular rim adapted to contact the inwardly tapered contacting wall in a manner causing the interior gripping surface of the ferrule device to increasingly radially engage the tube member.

In another aspect of the present invention, a fluid connection system is provided including a plurality to tube member each having a fluid conduit extending therethrough and terminating at respective distal ends thereof. A fluid distribution device includes a housing formed to seat a connection member having a plurality of receiving ports each defined by an interior sealing wall and formed for sliding receipt of a distal end of a corresponding tube member therein. The connector member further defines a plurality of passages each extending therethrough and terminating in a corresponding receiving port. The connection system further includes a RAM device having proximal surface and an opposite distal surface facing toward the connector member, and having a plurality of alignment passages each defined by an alignment passage extending from the proximal face to the distal face for sliding receipt of a respective tube member therethrough. A plurality of ferrule devices each includes a proximal tube engaging portion, an opposite distal sealing portion and a tube receiving passage extending from the tube engaging portion to the sealing portion and formed for receipt of a respective tube member therethrough. Each tube engaging portion is formed and dimensioned to contact a respective alignment wall of the RAM device, and each the sealing portion of the ferrule device is formed and dimensioned to contact a respective sealing wall of the connector member. A spanner nut defines an access port for receipt of the tube members therethrough. The spanner nut is further adapted cooperate with the housing of the fluid distribution device to increasingly exert a compression force on the RAM device such that the respective alignment walls of the RAM device contact the tube engaging portions of the ferrule devices in a manner increasingly radially gripping the corresponding tube members for movement of the ferrule devices and the RAM device, as a unit, toward the connector member. Hence, the ferrule device sealing portions are increasingly urged into fluid sealing engagement with the connector member sealing wall to fluidly couple the tube member conduits to the corresponding connector member passages.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

BEST MODE OF CARRYING OUT THE INVENTION

Figure 1:
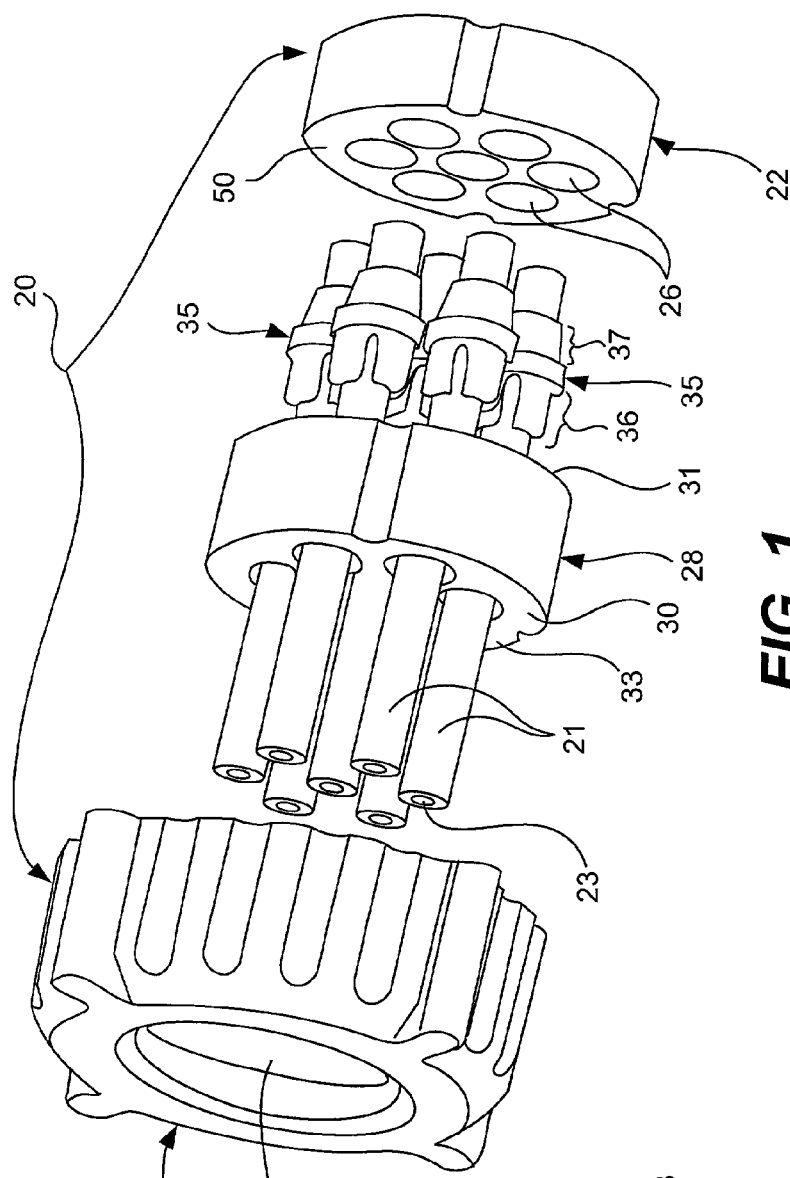
FIG. 1 is an exploded top perspective view of a fluid fitting assembly designed in accordance with the present invention.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Figure 2:
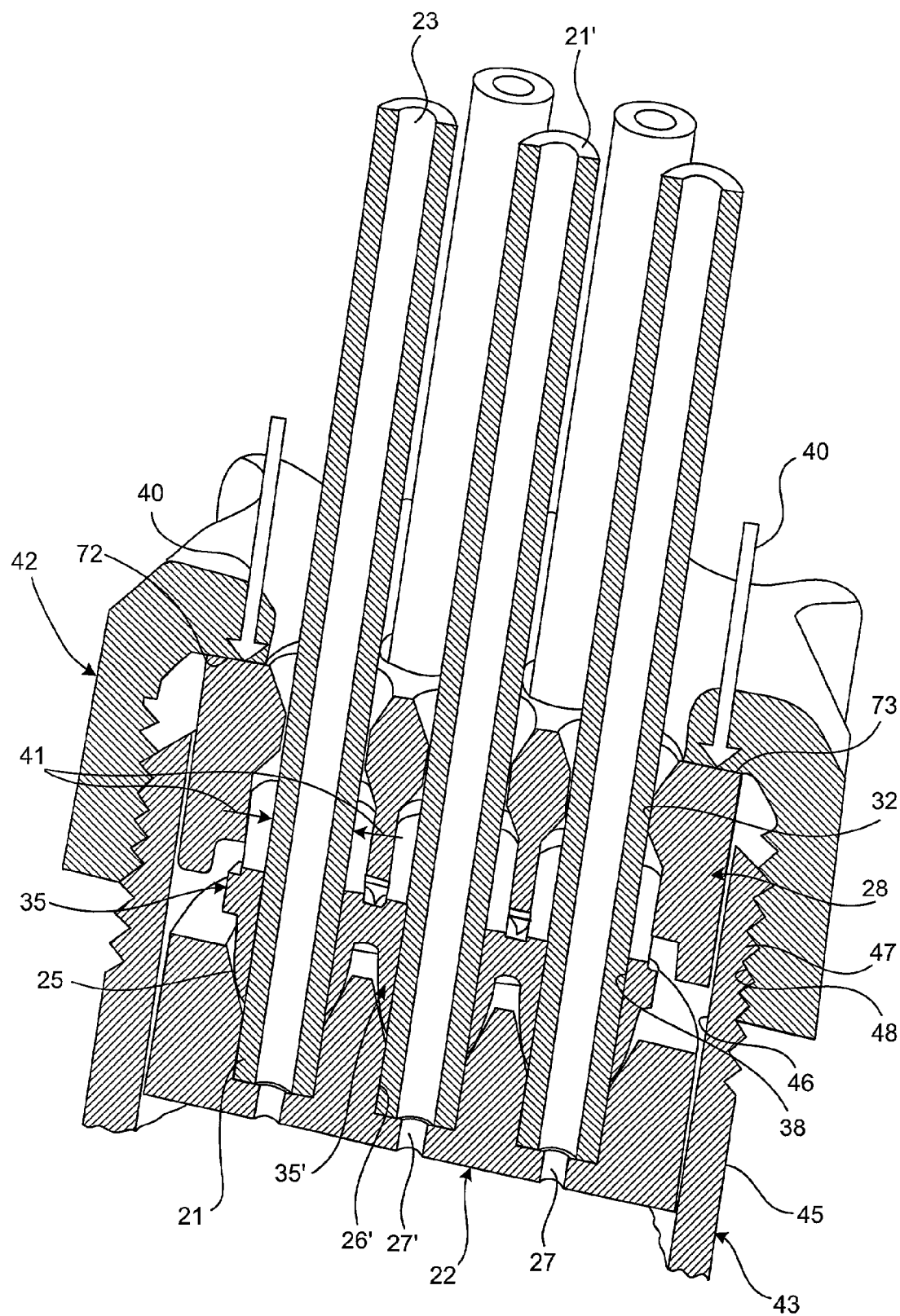
FIG. 2 is an enlarged top perspective view, in cross-section, of the fluid fitting assembly of FIG. 1, and illustrating the cooperation between the components.

Referring now to FIGS. 1–2, a fluid fitting assembly, generally designated 20, is provided for a fluid-tight coupling of a tube member 21 to a connector member 22. The tube member 21 includes a fluid conduit 23 extending axially therethrough and terminating at a distal end thereof. The connector member includes an interior sealing wall 25 which defines a receiving port 26 formed for sliding receipt of the distal end of the tube member therein. The connector member 22 further includes a fluid passage 27 extending therethrough which terminates in the receiving port 26. The fitting assembly includes a RAM device, generally designated 28, having proximal surface 30 and an opposite distal surface 31 facing toward the connector member (when mounted). An interior alignment wall 32 of the RAM device 28 defines an alignment passage 33 extending from the proximal surface to the distal surface for sliding receipt of the transverse cross-sectional dimension of the tube member 21 therethrough.

The fluid fitting further includes a ferrule device, generally designated 35, having a tube engaging portion 36 at a proximal end portion, and a sealing portion 37 at an opposite distal end portion thereof. The ferrule device defines a tube receiving passage 38 extending from the tube engaging portion 36 to the sealing portion 37. The tube receiving passage 38 is formed for receipt of the tube member 21 therethrough. The tube engaging portion 36 of the ferrule device 35 is formed and dimensioned to contact the RAM device alignment wall 32, while the sealing portion 37 is formed and dimensioned to contact the sealing wall 25 of the connector member 22 during assembly. When a compression force is increasingly applied to the RAM device 28 in a direction toward the connector member 22 (i.e., in the direction of arrows 40 in FIG. 2), the RAM device alignment wall 32 contacts the tube engaging portion 36 of the ferrule device 35 in manner increasingly radially gripping (i.e., in the direction of arrows 41 in FIG. 2) the tube member 21 for movement of the ferrule device 35 and the RAM device 28, as a unit, toward the connector member 22. Consequently, the ferrule device sealing portion 37 is increasingly urged the into fluid sealing engagement with the connector member sealing wall 25 for deformation thereof to fluidly couple the fluid conduit 23 of the tube member 21 to the fluid passage 27 of the connector member 22.

Accordingly, a single or multi-lumen fluid connection system is provided which enables a technician to connect a single or multiple lumens (tubes), as a cluster, to a connection device by simply pushing the tubes into the fluid fitting assembly and turning a spanner nut 42 (to be discussed) to lock the tubes into place. Hence, a simple rotational force applied by the spanner nut is translated into a substantial axial sealing force at each tube member to provide fluid coupling. Unlike the current fittings, the present inventive design eliminates the typical requirement of either flaring the end of the tubing and/or use of individual combinations of nuts and ferrules attached to the tubing and threaded into the device of interest. Moreover, the time-consuming process of tightening individual nuts on each tube or lumen, is thus, eliminated. Such removal of these individual nuts, more importantly, enables a reduction in the overall footprint of the fluid fitting assembly 20, or an increase in the tubing density.

Figure 3:
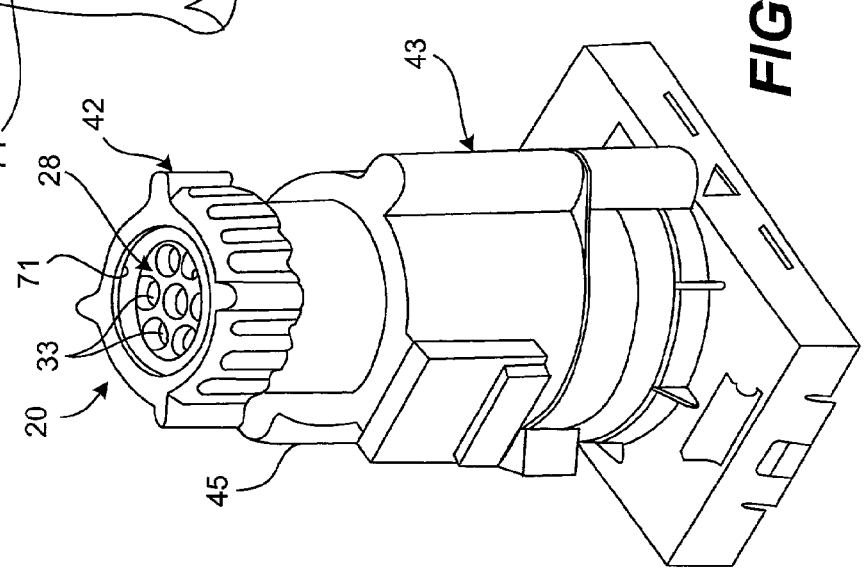
FIG. 3 is a top perspective view of a conventional rotor valve assembly with the fluid fitting assembly of FIG. 1 mounted thereto.

The fluid fitting assembly 20 of the present invention is preferably applied in high pressure (i.e., up to about 2000 psi) flat-face or rotor valve technology, as exemplified in the rotor valve 43 of FIG. 3 and as described in U.S. Pat. Nos. 4,158,630; 4,625,569 and 5,650,577. Hence, when the rotor valve 43 application provides switching between multi-lumens or tubes (i.e., a cluster), the fluid fitting assembly 20 can perform the fluid connection simultaneously as a unit, as represented in the drawings. It will be appreciated, however, that these fluid fittings can be adapted to any multi-lumen fluid connection applications, as well as single fluid fitting connector applications, and will be described as such for clarity.

Each tube member 21 is preferably composed of PEEK having an outer diameter typically in the range of about ⅛ inch to about 1/16 inch, and an inner diameter of the fluid conduit typically in the range of about 1/16 inch to about 1/32 inch. The connector member 22 is preferably provided by a stator element in fluid communication with a rotor element (not shown) for fluid switching operation therebetween. Both the stator element 22 and the rotor element are seated a rotor valve housing 45 of the rotor valve 43 (FIG. 3). Briefly, as shown in FIG. 2, this rotor valve housing 45 defining a cavity 46 formed to supportably seat the stator and the rotor elements therein. This valve housing is adapted to threadably mate with the spanner nut 42 (i.e., an exterior threaded portion 47 of the valve housing 45 with an interior threaded portion 48 of a spanner nut 42), for the purposes to be described below.

Figure 5:
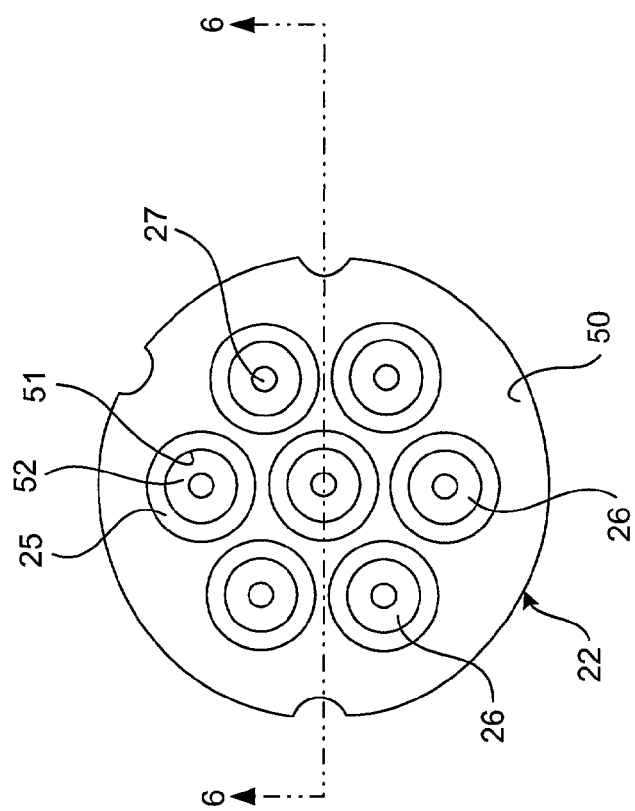
FIG. 5 is an enlarged top plan view of the stator element of FIG. 4.
Figure 4:
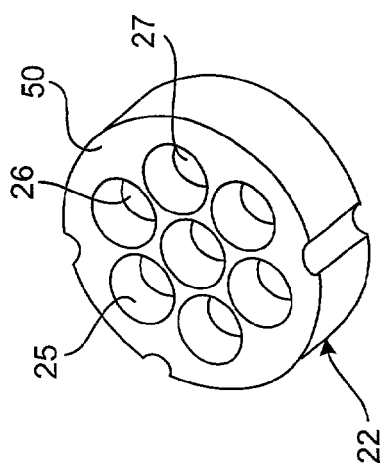
FIG. 4 is a top perspective view of a stator element of the fluid fitting assembly of FIG. 1.
Figure 6:
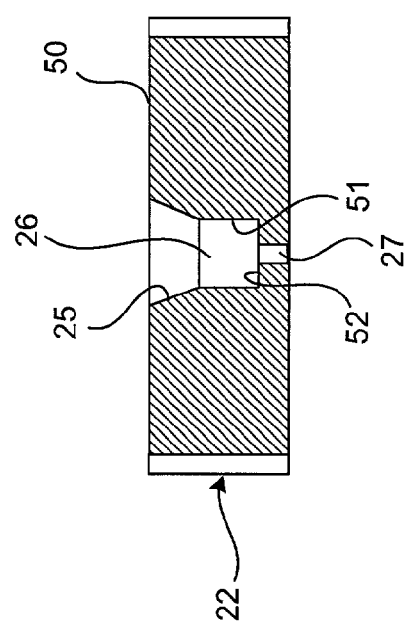
FIG. 6 is a side elevation view, in cross-section, of the stator element taken substantially along the plane of the line 6—6 in FIG. 5.

Referring now to FIGS. 4–6, the stator element 22 is preferably composed of a ceramic material having a proximal face 50 which defines the tube receiving ports 27. Each receiving port 26 is generally defined by a substantially cylindrical receiving port interior wall 51 (FIG. 6) having a diameter sized and dimensioned for sliding receipt of the distal end of the corresponding tube member 21. In the preferred embodiment, the diametrical tolerance between the receiving port interior wall 51 and the tube member 21 is in the range of about 0.001 inch to about 0.004 inch, and more preferably about 0.001 inch. Such tolerance permits sliding insertion and withdrawal of the tube member without excessive lateral movement therebetween.

A bottom wall 52, defining the bottom portion of the receiving port 26, limits the insertion of the corresponding tube member 21 therein, and provides the fluid communication with the fluid passage 27 of the stator element 22. Each receiving port 26 further includes a stator sealing wall 25 flaring or tapering outwardly toward the proximal face 50 thereof. As will be described in greater detail below, it is this sealing wall 25 which the sealing portion 37 of the ferrule device deformably engages for fluid sealing therebetween.

Figure 7:
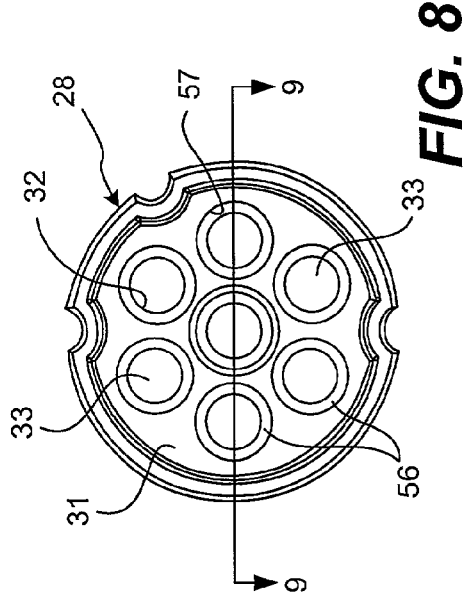
FIG. 7 is a bottom perspective view of a RAM device of the fluid fitting assembly of FIG. 1.
Figure 8:
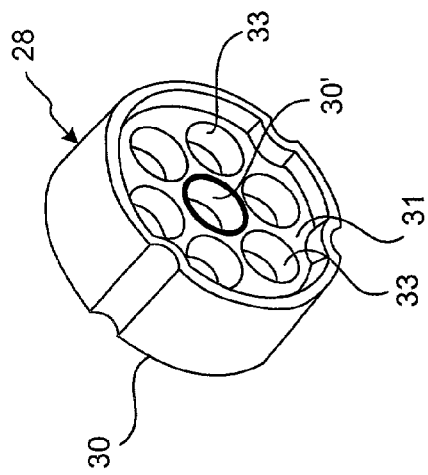
FIG. 8 is an enlarged bottom plan view of the RAM device of FIG. 7.

Turning now to RAM device 28 (FIGS. 7–9), it is this structure which applies the axial compression force to the ferrule or ferrule devices 35 to seal the respective distal sealing portion 37 thereof with the corresponding sealing wall 25 of the stator element 22. Briefly, as the RAM device 28 is mechanically driven down by compression force (in the direction of arrows 40 in FIG. 2 (toward the stator element 22)) onto the ferrule device 35, the RAM device initially collapses the ferrule tube engaging portion 36 (in the direction of arrows 41 in FIG. 2) radially inward and about the circumferential exterior surface 53 of the tube member 21. As the RAM device 28 securely grips the tube member, and as it is further displaced toward the stator element 22, the RAM device urges the sealing portion 37 of the ferrule device into sealing engagement with the sealing wall 25 of the stator element 22. When the sealing portion 37 is sufficiently deformed, and a sufficient axial compression force is applied, a fluid-tight seal is formed therebetween. Incidentally, the RAM device can be backed off to allow removal and reinsertion of individual tubes 21.

Thus, the RAM device is preferably composed of a substantially rigid material to effectively transmit the compression forces which is critical to the sealing characteristics of the invention. Preferably, this material is a stiff, glass and TEFLON® filled material which provides high strength with a relatively low friction component.

As mentioned, the RAM device 28 includes an alignment passage 33 extending longitudinally therethrough from the proximal surface 30 to the distal surface 31 thereof. Each alignment passage 33 is defined by an interior alignment wall 32 sized and dimensioned to slideably receive the transverse cross-sectional dimension of the tube member 21 without excessive lateral movement therebetween. The diametrical tolerance between the RAM device interior alignment wall 32 and the exterior surface of the tube member 21 is preferably in the range of about 0.001 inch to about 0.004 inch, and more preferably about 0.001 inch.

Figure 9:
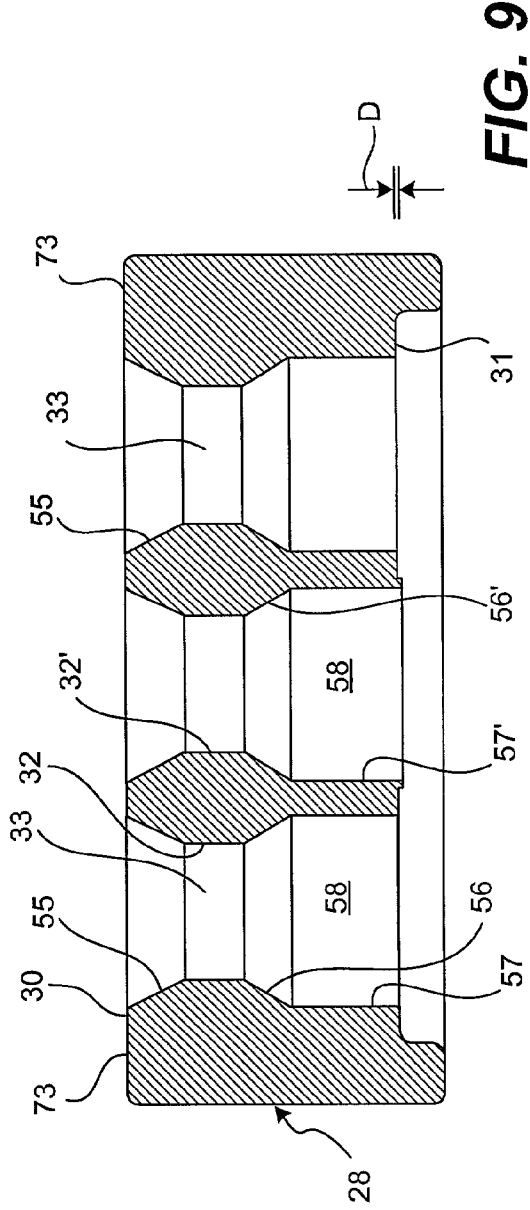
FIG. 9 is an enlarged side elevation view, in cross-section, of the RAM device taken substantially along the plane of the line 9—9 in FIG. 8.

Flaring or tapering outwardly from the interior alignment wall 32 in a direction toward the proximal surface 30 of the RAM device 28 is a guide wall 55 (FIG. 9). This conical flare facilitates insertion of the distal end of the tube member 21 through the alignment passage 33. Similarly, facing in a direction toward the proximal face 50 of the stator element 22, the interior alignment wall 32 flares or tapers outwardly toward the distal surface 31 of the RAM device 28. This outward taper is provided by a conical-shaped contacting wall 56 preferably angled in the range of about 29.5° to about 30.5° from the interior alignment wall 32, and more preferably at an angle of about 30°. The conical-shaped contacting wall 56 terminates at a substantially cylindrical support wall 57 extending distally and terminating at the distal surface 31. Collectively, the support wall 57 and the contacting wall 56 define a ferrule receiving recess 58 formed and dimensioned for sliding receipt of the tube engaging portion 36 of the corresponding ferrule device 35 therein.

The diametrical tolerance between the RAM device support wall 57 and a support surface 60 of the tube engaging portion 36 of the ferrule device, as will be discussed, is preferably in the range of about 0.000 inch to about 0.004 inch, and more preferably about 0.000 inch. Moreover, while this support wall 57 is preferably cylindrical, it will be appreciated that it may be slightly flared outwardly as well, although less so than the contacting wall 56, without departing from the true spirit and nature of the present invention. Such a slight flare may facilitate insertion of the ferrule engaging portion therein.

Figure 12:
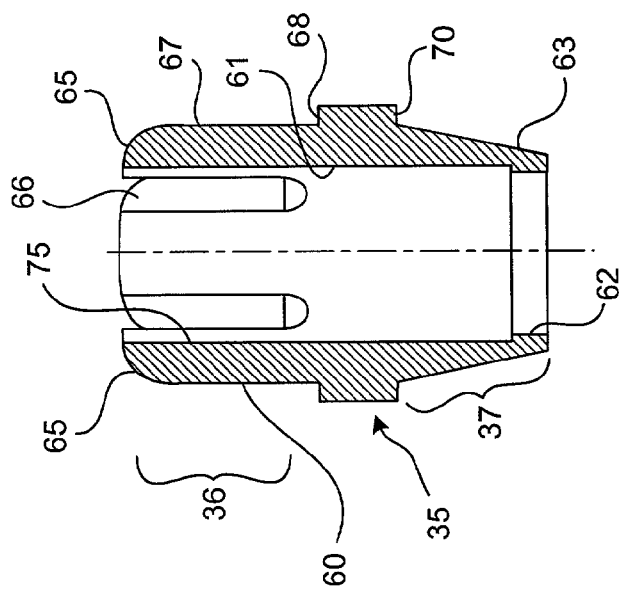
FIG. 12 is an enlarged side elevation view, in cross-section, of the ferrule device taken substantially along the plane of the line 12—12 in FIG. 11.
Figure 10:
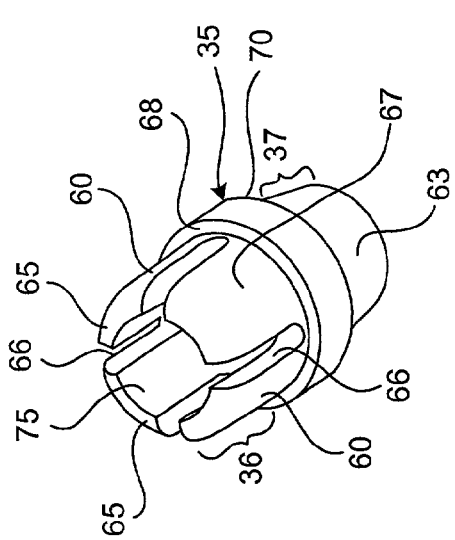
FIG. 10 is a top perspective view of a ferrule device of the fluid fitting assembly of FIG. 1.
Figure 11:
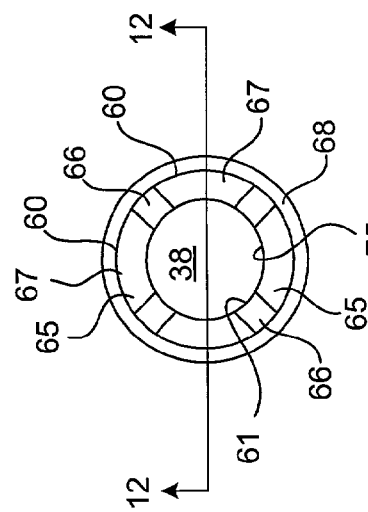
FIG. 11 is a top plan view of the ferrule device of FIG. 10.
Figure 13:
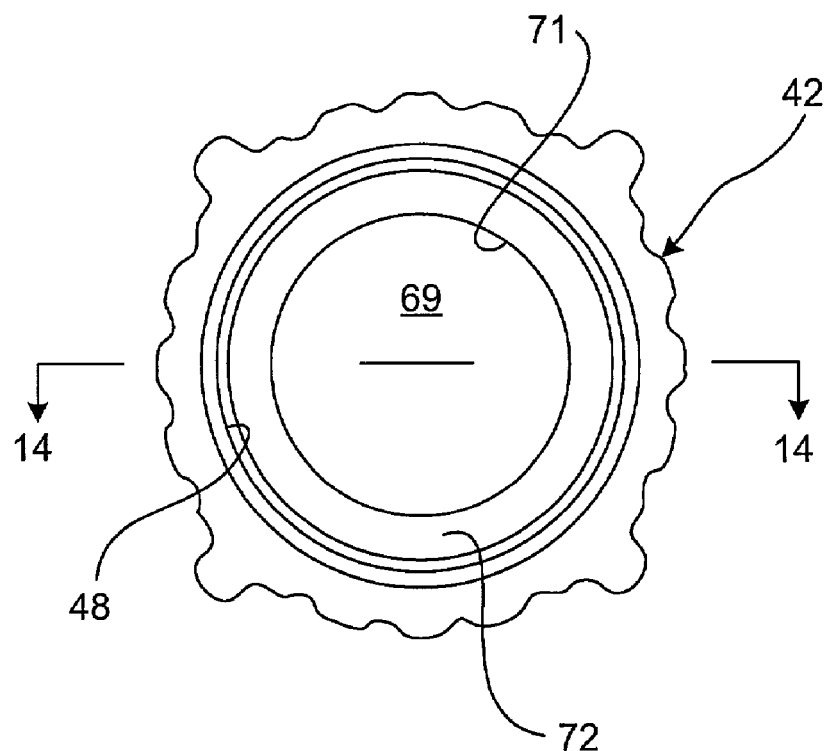
FIG. 13 is a bottom plan view of a spanner nut of the fluid fitting assembly of FIG. 1.
Figure 14:
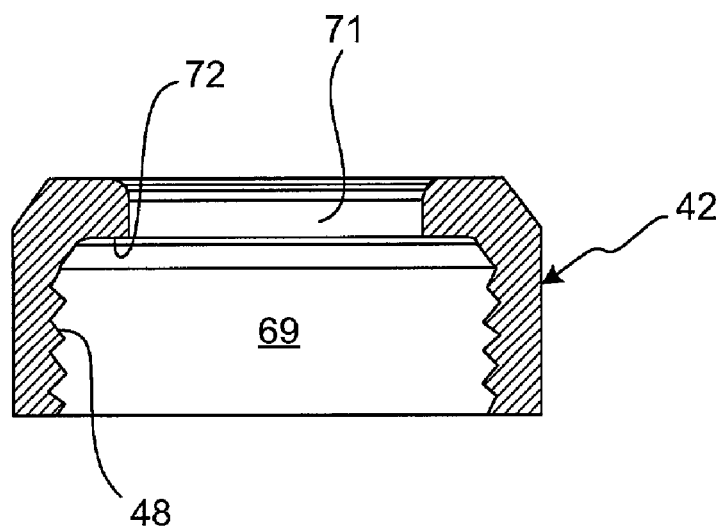
FIG. 14 is an enlarged side elevation view, in cross-section, of the spanner nut taken substantially along the plane of the line 14—14 in FIG. 13.

Attention is now directed to FIGS. 10–12 where the ferrule device 35 will be described in detail. This ferrule device is preferably an injection molded component preferably composed of deformable material. Preferred materials include TEFZFL, FEP PEEK, Kel-F and polypropylene.

As mentioned, the tube receiving passage 38 of the ferrule device 35 extends therethrough from the proximal tube engaging portion 36 to the distal sealing portion 37 thereof. The ferrule device 35 includes a substantially cylindrical interior wall 61 extending substantially from the tube engaging portion 36 to the sealing portion 37 thereof. The interior wall 61 is sized to slideably receive the tube member axially therethrough with very lateral movement therebetween. Preferably, the diametrical tolerance between the ferrule device interior wall 61 and the exterior surface 53 of the tube member 21 is in the range of about 0.001 inch to about 0.005 inch, and more preferably about 0.001 inch.

At the distal end of the interior wall 61 (FIG. 12), at the distal sealing portion 37, is an annular retention collar 62 extending radially inwardly toward the tube member 21. This collar 62, when engaged between the tube member 21 and the sealing wall 25 of the stator element 22, improves the sealing engagement therebetween, as well as improving the retention to the tube member 21. Preferably, this collar reduces the diametrical tolerance with the exterior surface 53 of the tube member 21 to the range of about 0.000 inch to about 0.004 inch, and more preferably about 0.000 inch.

As best viewed in FIG. 12, the distal sealing portion 37 of the ferrule device 35 includes a sealing surface 63 tapering inwardly in a direction toward the distal end thereof. This sealing surface 63 is preferably conical shaped, and is dimensioned for sealing engagement with the sealing wall 25 of the receiving port 26 of the stator element 22. Preferably, the inward taper is angled in the range of about 9.5° to about 10.5° from the longitudinal axis thereof, and more preferably at an angle of about 10°.

At the opposite proximal end is the ferrule device 35 is the tube engaging portion 36 which is adapted to radially engage the exterior surface of the tube member 21. The tube engaging portion 36 includes a substantially cylindrical support surface 60 formed for sliding receipt in the ferrule receiving recess 58 of the RAM device for aligned support thereof.

At the proximal end of the support surface 60, and hence, the engaging portion 36, is an annular contacting rim 65 curving inwardly from the support surface 60 toward the longitudinal axis. During sealing operation, this contacting rim 65 is formed to contact the tapered contacting wall 56 of the ferrule receiving recess 58, urging the engaging portion 36 of the ferrule into engaging contact with the exterior surface 53 of the tube member 21. This annular contacting rim 65 is preferably curvilinear in profile, having a radius of curvature in the range of about 0.027 inch to about 0.033 inch (FIG. 12).

To add flexibility to the engaging portion 36, at least one longitudinally extending slot 66 is provided, enabling the engaging portion to deform inwardly upon contact between the contacting rim 65 and the conical contacting wall of the RAM device 28. Preferably, as viewed in FIGS. 10 and 11, four slots 66 are provided, dividing the engaging portion 36 into four independent lobes 67 to grip the tube member 21. More or less slots may be included, however.

The ferrule device 35 further includes an annular proximal shoulder 68 facing proximally which limits the insertion of the ferrule device engaging portion 36 into the receiving recess 58 of the RAM device 28. The annular proximal shoulder 68 has a diameter larger than that of the ferrule receiving recess 58 so that contact with the distal surface 31 of the RAM device will limit insertion of the ferrule. Similarly, facing distally, is an annular distal shoulder 70. Contact of the annular distal shoulder 70 with the proximal surface 30 of the stator element will limit insertion of the ferrule device 35, as well.

During assembly, the proximal tube engaging portion 36 of the ferrule device 35 is slideably passed through the receiving recess 58 of the alignment passage 33 of the RAM device 28. It is important to note that the annular contact rim 65 of the ferrule engaging portion 36 should not initially contact the tapered contacting wall 56 with too much force so as to adversely impede passage of the tube member 21 there through at a later time. The distal sealing portion 37 of the ferrule device 35 is then inserted into the receiving port 26 of stator element 22, already seated in the cavity 46 of the valve housing 45. These assembly steps may of course be reversed.

Subsequently, the spanner nut 42 is positioned over the RAM device 28 and threaded to the valve housing by threadably mating the interior threaded portion 48 thereof to the exterior threaded portion 47 of the housing 45. Again, the spanner nut 42 is not threaded too tightly to the valve housing significantly impede passage of the tube member 21 therethrough. Briefly, the spanner nut 42 provides a central cavity 69 for receipt of the RAM device 28 therein during operation. This spanner nut 42, as viewed in FIGS. 2, 3, 13 and 14, includes an access port 71 which enable communication of the tube members 21 with the alignment passages 33 of the RAM device 28 while threadably mounted to the valve housing 45. Accordingly, the distal ends of the tube members 21 can be inserted through the RAM device alignment passage 33 and into the receiving port 26 of the stator element 22, or removed therefrom, without removal of the spanner nut 42 from the valve housing 45.

In operation, the distal end of the tube member 21 can simply be inserted into the RAM device alignment passage 33, through the tube receiving passage 38 of the ferrule device 35, and into the receiving port 26 of the stator element. While not necessary, it is preferably to contact the distal tip of the tube member 21 with the bottom wall 52 of the receiving port 26 to assure proper insertion. When insertion of the tube member is complete, the spanner nut 42 is simply manually tightened to form a fluid tight seal of the ferrule device 35 against the sealing wall 25 of the stator element.

More descriptively, however, when threaded portions 47, 48 are sufficiently threadably mated, an annular under-shoulder 72 of the spanner nut 42 slideably contacts an annular contact shoulder 73 of the RAM device 28 (FIGS. 2 and 9). As the spanner nut is increasingly threaded, the rotational force applied to the spanner nut is translated to an axial compression force acting upon the RAM device 28 (in the direction of arrows 40) through the contact between the spanner nut annular under-shoulder 72 and the RAM device annular contact shoulder 73. As the proximal engaging portion 36 of the ferrule device axially slides into the ferrule receiving recess 58 of the RAM device 28, the contact rim 65 of the ferrule device engages the tapered contacting wall 56 of the RAM device, causing inward radial movement of the individual lobe portions 67 of the engaging portion 36 in the direction of arrows 41. Consequently, an interior gripping surface 75 of lobe portions 67 radially and circumferentially engage the exterior surface 53 of the tube member 21. As the ferrule device 35 clamps down upon the tube member 21, further axial movement of the RAM device 28 cause the ferrule device and the tube member collectively move as a unit.

Thus, as the spanner nut 42 is further threaded about the valve housing, the RAM device 28 and the ferrule device 35 are urged forwardly, as a unit, into contact with the sealing wall 25 of the stator element 28. The sealing surface 63 of the ferrule device sealing portion 37 deformably engages the sealing wall 25 to form a fluid tight seal thereagainst. This arrangement can exert up to about 100 lbs of force per ferrule, resulting in a fluid tight seal suitable for applications up to about 2000 psi.

Conversely, the spanner nut 42 can be simply untightened from the valve housing 45 by a sufficient amount until the tube member 21 can be withdrawn from the receiving port 26 of the stator element.

In accordance with the present invention, as mentioned, these fluid fittings are particularly suitable for multiple lumens or tube members 21 applications. Unlike the current fluid connections, the present inventions enables simple insertion of all the tube member 21 into their respective receiving ports 27, and then subsequently the spanner nut 42 can be tightened so that the entire cluster of tube members 21 are collectively fluid tight sealed to their corresponding fluid passages 25 as a unit rather than independently. This not only simplifies use, but also reduces the overall size and reduces material costs.

Since the cluster of tube members 21 are simultaneously fluid sealed to the stator element 22 as a unit, it is preferably to exert substantially the same axial compression force on all ferrule devices 35 in the cluster. The spanner nut 42 configuration, however, only enables annular contact between the under-shoulder 72 and the contact shoulder 73 of the RAM device 28. Thus, although the material of the RAM device 28 is substantially rigid and stiff, the central portion of the RAM device is subject to slight bowing thereof, reducing the effectiveness of the compression force exerted on the central ferrule device 35' (FIG. 2). Consequently, the fluid sealing properties for this ferrule device 35' may be reduced, as compared to the surrounding ferrule devices.

In accordance with another aspect of the present invention, to compensate for such a concave bow of this central portion, the central alignment passage is off-set a predetermined distance D closer to the stator element 22. As clearly shown in the cross-sectional view of FIG. 9, this off-set positions the entire ferrule receiving recess 58 of the alignment passage 33 that predetermined distance closer to engagement with the ferrule device 35. Accordingly, engaging contact with the contact rim 65 of the corresponding ferrule device 35' will occur at about this predetermined distance D before the surrounding ferrule devices 35 to compensate for this central bowing, and thus provide a substantially similar compression force as the surrounding ferrules. In the preferred embodiment, this predetermined distance D is in the range of about 0.004 inch to about 0.006 inch, and more preferably about 0.005 inch.

Although only a few embodiments of the present inventions have been described in detail, it should be understood that the present inventions may be embodied in many other specific forms without departing from the spirit or scope of the inventions.

What is claimed is:

1. A high pressure fluid fitting assembly for a fluid-tight coupling of a tube member, having a conduit, to a connector member having a receiving port defined by an interior sealing wall and a bottom end wall, and formed for sliding receipt of said tube member until a distal end thereof seats against said bottom end wall, said connector member further defining a passage extending therethrough and terminating in the receiving port, said fitting assembly comprising:

a contact device having proximal surface and an opposite distal surface facing toward said connector member, and having an interior alignment wall defining an alignment passage extending from the proximal face to the distal face for sliding receipt of the tube member therethrough; and a ferrule device having a proximal tube engaging portion, an opposite distal sealing portion and a tube receiving passage extending from the tube engaging portion to the sealing portion and formed for receipt of the tube member therethrough, said tube engaging portion includes at least one longitudinally extending slot, and being formed and dimensioned to contact the contact device alignment wall and said sealing portion being formed and dimensioned to contact the connector member sealing wall such that when a compression force is increasingly applied to the contact device in the direction toward the connector member, the contact device alignment wall contacts the ferrule device tube engaging portion in manner causing an interior gripping surface thereof to increasingly radially grip the tube member for movement of the ferrule device and the contact device, as a unit, toward the connector member to increasingly urge the ferrule device sealing portion into fluid sealing engagement with the connector member sealing wall and to fluidly couple the tube member conduit to the connector member passage, and increasingly urge said distal end of the tube member into seated engagement with the bottom end wall of the connecter member.

2. The fluid fitting assembly as defined by claim 1, further including:

a spanner nut defining an access port for receipt of said tube member therethrough, adapted to engage said contact device to exert said compression force.

3. The fluid fitting assembly as defined by claim 2, wherein the sealing portion of the ferrule device includes a sealing surface tapering inwardly toward the distal end thereof, and formed to increase the contact area with the connector member sealing wall as the compression force is increasingly applied.

4. The fluid fitting assembly as defined by claim 3, wherein said tube receiving passage of the ferrule device is defined by a substantially cylindrical interior wall, and said ferrule device further including:

a retention collar extending inwardly from said interior wall, and positioned proximate to the distal end of said sealing portion.

5. The fluid fitting assembly as defined by claim 2, wherein said interior gripping surface defining at least a portion of the tube receiving passage proximate the tube engaging portion, and said interior gripping surface increasingly circumferentially gripping said tube member as the compression force is increasingly applied.

6. The fluid fitting assembly as defined by claim 5, wherein
the interior alignment wall of the contact device includes a contacting wall tapering inwardly in a direction toward the proximal surface, and
said tube engaging portion of the ferrule device includes a proximal contacting rim adapted to contact the inwardly tapered contacting wall of the contact device in a manner causing the interior gripping surface of the ferrule device tube receiving passage to increasingly radially engage the tube member.

7. The fluid fitting assembly as defined by claim 6, wherein
said interior alignment wall of the contact device further includes a substantially cylindrical support wall extending in a direction distally from the contacting wall and terminating at the distal surface thereof to define a ferrule receiving recess, and
said tube engaging portion of the ferrule device further includes a substantially cylindrical alignment surface extending distally from the contacting rim, and formed and dimensioned for sliding engagement with the substantially cylindrical support wall of the contact device.

8. The fluid fitting assembly as defined by claim 6, wherein
the proximal end of the ferrule device tube engaging portion tapers inwardly to define the contacting rim.

9. The fluid fitting assembly as defined by claim 8, wherein
said ferrule device includes a distal shoulder portion adapted to contact a proximal face of the connector member to limit insertion of the ferrule device sealing portion into the connector member receiving port, and a proximal shoulder portion adapted to contact the distal surface of the contact device to limit insertion of the tube engaging portion of the ferrule device into the contact device alignment passage.

10. A high pressure fluid fitting assembly for a fluid-tight coupling of a plurality of tube members, each having a conduit, to a connector member as a unit, said connector member having a plurality of receiving ports each defined by an interior sealing wall and a bottom end wall, and each formed for sliding receipt of a corresponding tube member until a distal end thereof seats against the respective bottom end wall, said connector member further defining a plurality of passages each extending therethrough and terminating in a corresponding receiving port, said fitting assembly comprising:
a contact device a having proximal surface and an opposite distal surface facing toward said connector member, and having a plurality of alignment passages each defined by an alignment wall extending from the proximal face to the distal face for sliding receipt of a respective tube member therethrough; and
a plurality of ferrule devices each having a proximal tube engaging portion, an opposite distal sealing portion and a tube receiving passage extending from the tube engaging portion to the sealing portion and formed for receipt of a respective tube member therethrough, each said tube engaging portion being formed and dimensioned to contact a respective alignment wall of the contact device and each said sealing portion of the ferrule device being formed and dimensioned to contact a respective sealing wall of the connector member such that when a compression force is increasingly applied to the contact device in the direction toward the connector member, the respective alignment walls of the contact device contact the tube engaging portions of the ferrule devices in a manner causing a respective interior gripping surface thereof to increasingly radially grip the corresponding tube members for movement of the ferrule devices and the contact device, as a unit, toward the connector member to increasingly urge the ferrule device sealing portions into fluid sealing engagement with the connector member sealing wall and to fluidly couple the tube member conduits to the corresponding connector member passages, and increasingly urge said distal ends of the tube members into seated engagement with the respective bottom end walls of the connecter member.

11. The fluid fitting assembly as defined by claim 10, further including:
a spanner nut defining an access port for receipt of said tube members therethrough, and adapted to engage said contact device to exert said compression force.

12. The fluid fitting assembly as defined by claim 11, wherein
an annular under-shoulder of the spanner nut slideably contacts an annular contact shoulder of contact device to exert said compression force.

13. The fluid fitting assembly as defined by claim 12, wherein
a central ferrule receiving recess positioned proximate a center of said contact device is off-set a predetermined distance closer to the connector member relative the surrounding receiving recesses.

14. The fluid fitting assembly as defined by claim 13, wherein
said predetermined distance is in the range of about 0.004 inch to about 0.006 inch.

15. The fluid fitting assembly as defined by claim 10, wherein
the sealing portions of each ferrule device include a sealing surface tapering inwardly toward the distal end thereof, and formed to increase the contact area with the respective sealing wall of the connector member as the compression force is increasingly applied.

16. The fluid fitting assembly as defined by claim 15, wherein
each sealing portion of the ferrule device is conical-shaped.

17. The fluid fitting assembly as defined by claim 16, wherein
each ferrule device includes a distal shoulder portion adapted to contact a proximal face of the connector member to limit insertion of the ferrule device sealing portion into the connector member receiving port.

18. The fluid fitting assembly as defined by claim 17, wherein
each distal shoulder portion extends circumferentially around the respective ferrule device.

19. The fluid fitting assembly as defined by claim 15, wherein
each tube receiving passage of the respective ferrule device is defined by a substantially cylindrical interior wall, and each ferrule device further including:
a retention collar extending inwardly from said interior wall, and positioned proximate to the distal end of the respective sealing portion.

20. The fluid fitting assembly as defined by claim 10, wherein
each said interior gripping surface defining at least a portion of the tube receiving passage proximate the tube engaging portion, and said interior gripping surface increasingly circumferentially gripping the respective tube member as the compression force is increasingly applied.

21. The fluid fitting assembly as defined by claim 20, wherein
each interior alignment wall of the contact device includes a contacting wall tapering inwardly in a direction toward the proximal surface, and
each tube engaging portion of the respective ferrule device includes a proximal contacting rim adapted to contact the inwardly tapered contacting wall of the contact device in a manner causing the interior gripping surface of the respective tube receiving passage of the ferrule device to increasingly radially engage the tube member.

22. The fluid fitting assembly as defined by claim 21, wherein
each interior alignment wall of the contact device further includes a substantially cylindrical support wall extending in a direction distally from the contacting wall and terminating at the distal surface thereof to define a ferrule receiving recess, and
each tube engaging portion of the ferrule device further includes a substantially cylindrical alignment surface extending distally from the contacting rim, and formed and dimensioned for sliding engagement with the respective substantially cylindrical support wall of the contact device.

23. The fluid fitting assembly as defined by claim 22, wherein
the proximal end of the each ferrule device tube engaging portion tapers inwardly to define the contacting rim.

24. The fluid fitting assembly as defined by claim 23, wherein
the inwardly taper of the each contacting rim is curvilinear in profile.

25. The fluid fitting assembly as defined by claim 22, wherein
each said ferrule device includes a proximal shoulder portion adapted to contact the distal surface of the contact device to limit insertion of the tube engaging portion of the ferrule device into the respective contact device receiving recess.

26. The fluid fitting assembly as defined by claim 20, wherein
each said engaging portion of the ferrule device includes at least one longitudinally extending slot to facilitate engagement with the respective tube member.

27. A high pressure fluid connection system comprising:
a plurality of tube members each having a fluid conduit extending therethrough and terminating at respective distal ends thereof,
a fluid distribution device having a housing formed to seat a connection member having a plurality of receiving ports each defined by an interior sealing wall and a bottom end wall, and each formed for sliding receipt of a corresponding tube member until a distal end thereof seats against the respective bottom end wall, said connector member further defining a plurality of passages each extending therethrough and terminating in a corresponding receiving port;
a contact device having proximal surface and an opposite distal surface facing toward said connector member, and having a plurality of alignment passages each defined by an alignment passage extending from the proximal face to the distal face for sliding receipt of a respective tube member therethrough; and
a plurality of ferrule devices each having a proximal tube engaging portion, an opposite distal sealing portion and a tube receiving passage extending from the tube engaging portion to the sealing portion and formed for receipt of a respective tube member therethrough, each said tube engaging portion being formed and dimensioned to contact a respective alignment wall of the contact device and each said sealing portion of the ferrule device being formed and dimensioned to contact a respective sealing wall of the connector member; and
a spanner nut defining an access port for receipt of said tube members therethrough, and adapted cooperate with the housing of the fluid distribution device to increasingly exert a compression force on said contact device such that the respective alignment walls of the contact device contact the tube engaging portions of the ferrule devices in a manner causing a respective interior gripping surface thereof to increasingly radially grip the corresponding tube members for movement of the ferrule devices and the contact device, as a unit, toward the connector member to increasingly urge the ferrule device sealing portions into fluid sealing engagement with the connector member sealing wall and to fluidly couple the tube member conduits to the corresponding connector member passages, and increasingly urge said distal ends of the tube members into seated engagement with the respective bottom end walls of the connecter member.

28. The fluid fitting assembly as defined by claim 27, wherein
the sealing portions of each ferrule device include a sealing surface tapering inwardly toward the distal end thereof, and formed to increase the contact area with the respective sealing wall of the connector member as the compression force is increasingly applied.

29. The fluid fitting assembly as defined by claim 27, wherein
each said interior gripping surface defining at least a portion of the tube receiving passage proximate the tube engaging portion, and said interior gripping surface increasingly circumferentially gripping the respective tube member as the compression force is increasingly applied.

30. The fluid fitting assembly as defined by claim 29, wherein
each interior alignment wall of the contact device includes a contacting wall tapering inwardly in a direction toward the proximal surface, and
each tube engaging portion of the respective ferrule device includes a proximal contacting rim adapted to contact the inwardly tapered contacting wall of the contact device in a manner causing the interior gripping surface of the respective tube receiving passage of the ferrule device to increasingly radially engage the tube member.

31. The fluid fitting assembly as defined by claim 30, wherein
each interior alignment wall of the contact device further includes a substantially cylindrical support wall extending in a direction distally from the contacting wall and terminating at the distal surface thereof to define a ferrule receiving recess, and
each tube engaging portion of the ferrule device further includes a substantially cylindrical alignment surface extending distally from the contacting rim, and formed and dimensioned for sliding engagement with the respective substantially cylindrical support wall of the contact device.

32. The fluid fitting assembly as defined by claim 29, wherein
each tube receiving passage of the respective ferrule device is defined by a substantially cylindrical interior wall, and each ferrule device further including:
a retention collar extending inwardly from said interior wall, and positioned proximate to the distal end of the respective sealing portion.

33. The fluid fitting assembly as defined by claim 32, wherein
each said engaging portion of the ferrule device includes at least one longitudinally extending slot to facilitate engagement with the respective tube member.

34. The fluid fitting assembly as defined by claim 27, wherein
an annular under-shoulder of the spanner nut slideably contacts an annular contact shoulder of contact device to exert said compression force.

35. The fluid fitting assembly as defined by claim 34, wherein
a central ferrule receiving recess positioned proximate a center of said contact device is off-set a predetermined distance closer to the connector member relative to the surrounding receiving recesses.

36. A fluid fitting assembly for a fluid-tight coupling of a tube member, having a conduit, to a connector member having a receiving port defined by an interior sealing wall and formed for sliding receipt of the distal end of said tube member therein, said connector member further defining a passage extending therethrough and terminating in the receiving port, said fitting assembly comprising:
a contact device having proximal surface and an opposite distal surface facing toward said connector member, and having an interior alignment wall defining an alignment passage extending from the proximal face to the distal face for sliding receipt of the tube member therethrough, and including a contacting wall tapering inwardly in a direction toward the proximal surface; and
a ferrule device having a proximal tube engaging portion, an opposite distal sealing portion and a tube receiving passage defined by a substantially cylindrical interior wall and extending from the tube engaging portion to the sealing portion, and formed for receipt of the tube member therethrough, said ferrule device further including a retention collar extending inwardly from said interior wall, and said tube engaging portion including a proximal contacting rim adapted to contact the inwardly tapered contacting wall of the contact device and an interior gripping surface defining at least a portion of the tube receiving passage, and said sealing portion being formed and dimensioned to contact the connector member sealing wall such that when a compression force is increasingly applied to the contact device in the direction toward the connector member, the contact device alignment wall contacts the ferrule device tube engaging portion in manner increasingly causing the interior gripping surface to radially grip the tube member for movement of the ferrule device and the contact device, as a unit, toward the connector member to increasingly urge the ferrule device sealing portion into fluid sealing engagement with the connector member sealing wall and to fluidly couple the tube member conduit to the connector member passage.

37. The fluid fitting assembly as defined by claim 36, wherein
said retention collar positioned proximate to the distal end of said sealing portion.

38. The fluid fitting assembly as defined by claim 36, wherein
said engaging portion includes at least one longitudinally extending slot to facilitate engagement with said tube member.

39. A fluid fitting assembly for a fluid-tight coupling of a plurality of tube members, each having a conduit, to a connector member as a unit, said connector member having a plurality of receiving ports each defined by an interior sealing wall and formed for sliding receipt of a distal end of a corresponding tube member therein, said connector member further defining a plurality of passages each extending therethrough and terminating in a corresponding receiving port, said fitting assembly comprising:
a contact device having proximal surface and an opposite distal surface facing toward said connector member, and having a plurality of alignment passages each defined by a respective alignment wall extending from the proximal face to the distal face for sliding receipt of a respective tube member therethrough, each said alignment walls includes a respective contacting wall tapering inwardly in a direction toward the proximal surface; and
a plurality of ferrule devices each having a proximal tube engaging portion, an opposite distal sealing portion and a tube receiving passage extending from the tube engaging portion to the sealing portion and formed for receipt of a respective tube member therethrough, each said tube engaging portion including a respective proximal contacting rim adapted to contact the corresponding inwardly tapered contacting wall of the contact device and an interior gripping surface defining at least a portion of the respective tube receiving passage, and each said sealing portion of the ferrule device being formed and dimensioned to contact a respective sealing wall of the connector member such that when a compression force is increasingly applied to the contact device in the direction toward the connector member, the respective alignment walls of the contact device contact the tube engaging portions of the ferrule devices in a manner increasingly radially gripping the corresponding tube members for movement of the ferrule devices and the contact device, as a unit, toward the connector member to increasingly urge the ferrule device sealing portions into fluid sealing engagement with the connector member sealing wall and to fluidly couple the tube member conduits to the corresponding connector member passages.

40. The fluid fitting assembly as defined by claim 39, further including:
a spanner nut defining an access port for receipt of said tube members therethrough, and adapted to engage said contact device to exert said compression force.

41. The fluid fitting assembly as defined by claim 39, wherein
each ferrule device includes a distal shoulder portion adapted to contact a proximal face of the connector member to limit insertion of the ferrule device sealing portion into the connector member receiving port.

42. The fluid fitting assembly as defined by claim 39, wherein
the proximal end of the each ferrule device tube engaging portion tapers inwardly to define the contacting rim.

43. The fluid fitting assembly as defined by claim 39, wherein
  each said ferrule device includes a proximal shoulder portion adapted to contact the distal surface of the contact device to limit insertion of the tube engaging portion of the ferrule device into the respective contact device receiving recess.

44. The fluid fitting assembly as defined by claim 39, wherein
  each said engaging portion of the ferrule device includes at least one longitudinally extending slot to facilitate engagement with the respective tube member.

45. A fluid fitting assembly for a fluid-tight coupling of a plurality of tube members, each having a conduit, to a connector member as a unit, said connector member having a plurality of receiving ports each defined by an interior sealing wall and formed for sliding receipt of a distal end of a corresponding tube member therein, said connector member further defining a plurality of passages each extending therethrough and terminating in a corresponding receiving port, said fitting assembly comprising:
  a contact device a having proximal surface and an opposite distal surface facing toward said connector member, and having a plurality of alignment passages each defined by an alignment passage extending from the proximal face to the distal face for sliding receipt of a respective tube member therethrough; and
  a plurality of ferrule devices each having a proximal tube engaging portion, an opposite distal sealing portion and a tube receiving passage extending from the tube engaging portion to the sealing portion and formed for receipt of a respective tube member therethrough, each said tube engaging portion being formed and dimensioned to contact a respective alignment wall of the contact device, and each including a respective interior gripping surface defining at least a portion of the respective tube receiving passage and at least one longitudinally extending slot to facilitate engagement with the respective tube member, and each said sealing portion of the ferrule device being formed and dimensioned to contact a respective sealing wall of the connector member such that when a compression force is increasingly applied to the contact device in the direction toward the connector member, the respective alignment walls of the contact device contact the tube engaging portions of the ferrule devices in a manner increasingly radially gripping the corresponding tube members for movement of the ferrule devices and the contact device, as a unit, toward the connector member to increasingly urge the ferrule device sealing portions into fluid sealing engagement with the connector member sealing wall and to fluidly couple the tube member conduits to the corresponding connector member passages.

46. The fluid fitting assembly as defined by claim 45, wherein
  each ferrule device includes a distal shoulder portion adapted to contact a proximal face of the connector member to limit insertion of the ferrule device sealing portion into the connector member receiving port.

47. The fluid fitting assembly as defined by claim 45, wherein
  each interior alignment wall of the contact device includes a contacting wall tapering inwardly in a direction toward the proximal surface, and
  each tube engaging portion of the respective ferrule device includes a proximal contacting rim adapted to contact the inwardly tapered contacting wall of the contact device in a manner causing the interior gripping surface of the respective tube receiving passage of the ferrule device to increasingly radially engage the tube member.

48. A fluid fitting assembly for a fluid-tight coupling of a plurality of tube members, each having a conduit, to a connector member as a unit, said connector member having a plurality of receiving ports each defined by an interior sealing wall and formed for sliding receipt of a distal end of a corresponding tube member therein, said connector member further defining a plurality of passages each extending therethrough and terminating in a corresponding receiving port, said fitting assembly comprising:
  a contact device a having proximal surface and an opposite distal surface facing toward said connector member, and having a plurality of alignment passages each defined by an alignment passage extending from the proximal face to the distal face for sliding receipt of a respective tube member therethrough;
  a spanner nut defining an access port for receipt of said tube members therethrough, and including an annular under-shoulder of the spanner nut adapted slideably engage an annular contact shoulder of contact device to exert a compression force thereon in the direction toward the connector member; and
  a plurality of ferrule devices each having a proximal tube engaging portion, an opposite distal sealing portion and a tube receiving passage extending from the tube engaging portion to the sealing portion and formed for receipt of a respective tube member therethrough, each said tube engaging portion being formed and dimensioned to contact a respective alignment wall of the contact device and each said sealing portion of the ferrule device being formed and dimensioned to contact a respective sealing wall of the connector member such that when said compression force is increasingly applied to the contact device, the respective alignment walls of the contact device contact the tube engaging portions of the ferrule devices in a manner increasingly radially gripping the corresponding tube members for movement of the ferrule devices and the contact device, as a unit, toward the connector member to increasingly urge the ferrule device sealing portions into fluid sealing engagement with the connector member sealing wall and to fluidly couple the tube member conduits to the corresponding connector member passages, and a central ferrule receiving recess positioned proximate a center of said contact device is off-set a predetermined distance closer to the connector member relative the surrounding receiving recesses.

49. The fluid fitting assembly as defined by claim 48, wherein
  said predetermined distance is in the range of about 0.004 inch to about 0.006 inch.

50. The fluid fitting assembly as defined by claim 48, wherein
  each tube engaging portion of the respective ferrule device includes an interior gripping surface defining at least a portion of the tube receiving passage proximate the tube engaging portion, said interior gripping surface increasingly circumferentially gripping the respective tube member as the compression force is increasingly applied.

51. The fluid fitting assembly as defined by claim 50, wherein
each said engaging portion of the ferrule device includes at least one longitudinally extending slot to facilitate engagement with the respective tube member.

52. A fluid connection system comprising:
a plurality of tube members each having a fluid conduit extending therethrough and terminating at respective distal ends thereof,
a fluid distribution device having a housing formed to seat a connection member having a plurality of receiving ports each defined by an interior sealing wall and formed for sliding receipt of a distal end of a corresponding tube member therein, said connector member further defining a plurality of passages each extending therethrough and terminating in a corresponding receiving port;
a contact device having proximal surface and an opposite distal surface facing toward said connector member, and having a plurality of alignment passages each defined by an alignment passage extending from the proximal face to the distal face for sliding receipt of a respective tube member therethrough; and
a plurality of ferrule devices each having a proximal tube engaging portion, an opposite distal sealing portion and a tube receiving passage extending from the tube engaging portion to the sealing portion and formed for receipt of a respective tube member therethrough, each tube engaging portion includes an interior gripping surface defining at least a portion of the tube receiving passage proximate the tube engaging portion, each said tube engaging portion being formed and dimensioned to contact a respective alignment wall of the contact device, each said sealing portion of the ferrule device being formed and dimensioned to contact a respective sealing wall of the connector member, and each said engaging portion of the ferrule device includes at least one longitudinally extending slot to facilitate engagement with the respective tube member; and
a spanner nut defining an access port for receipt of said tube members therethrough, and adapted cooperate with the housing of the fluid distribution device to increasingly exert a compression force on said contact device such that the respective alignment walls of the contact device contact the tube engaging portions of the ferrule devices in a manner increasingly radially gripping the corresponding tube members for movement of the ferrule devices and the contact device, as a unit, toward the connector member to increasingly urge the ferrule device sealing portions into fluid sealing engagement with the connector member sealing wall and to fluidly couple the tube member conduits to the corresponding connector member passages.

53. The fluid fitting assembly as defined by claim 52, wherein
the sealing portions of each ferrule device include a sealing surface tapering inwardly toward the distal end thereof, and formed to increase the contact area with the respective sealing wall of the connector member as the compression force is increasingly applied.

54. A high pressure fluid fitting assembly for a fluid-tight coupling of a tube member, having a conduit, to a connector member having a receiving port defined by an interior sealing wall and a bottom end wall, and formed for sliding receipt of said tube member until a distal end thereof seats against said bottom end wall, said connector member further defining a passage extending therethrough and terminating in the receiving port, said fitting assembly comprising:
a contact device having proximal surface and an opposite distal surface facing toward said connector member, and having an interior alignment wall defining an alignment passage extending from the proximal face to the distal face for sliding receipt of the tube member therethrough;
a ferrule device having a proximal tube engaging portion, an opposite distal sealing portion and a tube receiving passage defined by a substantially cylindrical interior wall and extending from the tube engaging portion to the sealing portion, and formed for receipt of the tube member therethrough, said ferrule device further including a retention collar extending inwardly from said interior wall, and said tube engaging portion being formed and dimensioned to contact the contact device alignment wall and said sealing portion being formed and dimensioned to contact the connector member sealing wall such that when a compression force is increasingly applied to the contact device in the direction toward the connector member, the contact device alignment wall contacts the ferrule device tube engaging portion in manner causing an interior gripping surface thereof to increasingly radially grip the tube member for movement of the ferrule device and the contact device, as a unit, toward the connector member to increasingly urge the ferrule device sealing portion into fluid sealing engagement with the connector member sealing wall and to fluidly couple the tube member conduit to the connector member passage, and increasingly urge said distal end of the tube member into seated engagement with the bottom end wall of the connecter member.

55. The fluid fitting assembly as defined by claim 54, wherein
the sealing portion of the ferrule device includes a sealing surface tapering inwardly toward the distal end thereof, and formed to increase the contact area with the connector member sealing wall as the compression force is increasingly applied.

56. The fluid fitting assembly as defined by claim 54, wherein
said retention collar is positioned proximate to the distal end of said sealing portion.

57. The fluid fitting assembly as defined by claim 54, wherein
said interior gripping surface defining at least a portion of the tube receiving passage proximate the tube engaging portion, and said interior gripping surface increasingly circumferentially gripping said tube member as the compression force is increasingly applied.

58. The fluid fitting assembly as defined by claim 57, wherein
the interior alignment wall of the contact device includes a contacting wall tapering inwardly in a direction toward the proximal surface, and
said tube engaging portion of the ferrule device includes a proximal contacting rim adapted to contact the inwardly tapered contacting wall of the contact device in a manner causing the interior gripping surface of the ferrule device tube receiving passage to increasingly radially engage the tube member.

59. The fluid fitting assembly as defined by claim 58, wherein
said interior alignment wall of the contact device further includes a substantially cylindrical support wall extending in a direction distally from the contacting wall and terminating at the distal surface thereof to define a ferrule receiving recess, and said tube engaging portion of the ferrule device further includes a substantially cylindrical alignment surface extending distally from the contacting rim, and formed and dimensioned for sliding engagement with the substantially cylindrical support wall of the contact device.

60. The fluid fitting assembly as defined by claim 58, wherein the proximal end of the ferrule device tube engaging portion tapers inwardly to define the contacting rim.

61. The fluid fitting assembly as defined by claim 54, wherein said engaging portion includes at least one longitudinally extending slot to facilitate engagement with said tube member.

62. A high pressure fluid fitting assembly for a fluid-tight coupling of a tube member, having a conduit, to a connector member having a receiving port defined by an interior sealing wall and a bottom end wall, and formed for sliding receipt of said tube member until a distal end thereof seats against said bottom end wall, said connector member further defining a passage extending therethrough and terminating in the receiving port, said fitting assembly comprising:

a contact device having proximal surface and an opposite distal surface facing toward said connector member, and having an interior alignment wall defining an alignment passage extending from the proximal face to the distal face for sliding receipt of the tube member therethrough; and a ferrule device having a proximal tube engaging portion, an opposite distal sealing portion and a tube receiving passage defined by a substantially cylindrical interior wall and extending from the tube engaging portion to the sealing portion, and formed for receipt of the tube member therethrough, said ferrule device further including a retention collar extending inwardly from said interior wall, and said tube engaging portion being formed and dimensioned to contact the contact device alignment wall and said sealing portion being formed and dimensioned to contact the connector member sealing wall such that when a compression force is increasingly applied to the contact device in the direction toward the connector member, the contact device alignment wall contacts the ferrule device tube engaging portion in manner causing an interior gripping surface thereof to increasingly radially grip the tube member for movement of the ferrule device and the contact device, as a unit, toward the connector member to increasingly urge the ferrule device sealing portion into fluid sealing engagement with the connector member sealing wall and to fluidly couple the tube member conduit to the connector member passage, and increasingly urge said distal end of the tube member into seated engagement with the bottom end wall of the connecter member.

63. The fluid fitting assembly as defined by claim 62, wherein said retention collar being positioned proximate to the distal end of said sealing portion.

64. The fluid fitting assembly as defined by claim 62, wherein said interior gripping surface defining at least a portion of the tube receiving passage proximate the tube engaging portion, and said interior gripping surface increasingly circumferentially gripping said tube member as the compression force is increasingly applied.

65. A fluid fitting assembly for a fluid-tight coupling of a tube member, having a conduit, to a connector member having a receiving port defined by an interior sealing wall and formed for sliding receipt of the distal end of said tube member therein, said connector member further defining a passage extending therethrough and terminating in the receiving port, said fitting assembly comprising:

a contact device having proximal surface and an opposite distal surface facing toward said connector member, and having an interior alignment wall defining an alignment passage extending from the proximal face to the distal face for sliding receipt of the tube member therethrough, and including a contacting wall tapering inwardly in a direction toward the proximal surface, said interior alignment wall further including a substantially cylindrical support wall extending in a direction distally from the contacting wall and terminating at the distal surface thereof to define a ferrule receiving recess; and a ferrule device having a proximal tube engaging portion, an opposite distal sealing portion and a tube receiving passage extending from the tube engaging portion to the sealing portion and formed for receipt of the tube member therethrough, said tube engaging portion including a proximal contacting rim adapted to contact the inwardly tapered contacting wall of the contact device and an interior gripping surface defining at least a portion of the tube receiving passage, said tube engaging portion further includes a substantially cylindrical alignment surface extending distally from the contacting rim, and formed and dimensioned for sliding engagement with the substantially cylindrical support wall of the contact device, and said sealing portion being formed and dimensioned to contact the connector member sealing wall such that when a compression force is increasingly applied to the contact device in the direction toward the connector member, the contact device alignment wall contacts the ferrule device tube engaging portion in manner increasingly causing the interior gripping surface to radially grip the tube member for movement of the ferrule device and the contact device, as a unit, toward the connector member to increasingly urge the ferrule device sealing portion into fluid sealing engagement with the connector member sealing wall and to fluidly couple the tube member conduit to the connector member passage.

* * * * *